(12) United States Patent
Goldberg et al.

(10) Patent No.: US 12,316,698 B2
(45) Date of Patent: May 27, 2025

(54) ROBOTIC PROCESS AUTOMATION FOR TELECOM EXPENSE MANAGEMENT INFORMATION CHANGE DETECTION AND NOTIFICATION

(71) Applicant: Tangoe US, Inc., Stamford, CT (US)

(72) Inventors: Zachary Goldberg, Indianapolis, IN (US); Jaan Leemet, Aventura, FL (US)

(73) Assignee: TANGOE US, INC., Stamford, CT (US)

( * ) Notice: Subject to any disclaimer, the term of this patent is extended or adjusted under 35 U.S.C. 154(b) by 0 days.

(21) Appl. No.: 18/147,352

(22) Filed: Dec. 28, 2022

(65) Prior Publication Data

US 2023/0216913 A1 Jul. 6, 2023

Related U.S. Application Data

(60) Provisional application No. 63/295,715, filed on Dec. 31, 2021.

(51) Int. Cl.
*H04L 67/025* (2022.01)
*G06F 16/951* (2019.01)

(52) U.S. Cl.
CPC .......... *H04L 67/025* (2013.01); *G06F 16/951* (2019.01)

(58) Field of Classification Search
CPC ... H04L 12/14–1428; H04L 67/02–025; G06F 16/951; G06F 16/953; G06F 16/9532; G06F 16/9538; G06Q 30/04
See application file for complete search history.

(56) References Cited

U.S. PATENT DOCUMENTS

| | | | | |
|---|---|---|---|---|
| 7,310,632 | B2 * | 12/2007 | Meek | G06F 16/951 |
| | | | | 707/E17.108 |
| 10,491,622 | B2 * | 11/2019 | Chawla | H04L 63/12 |
| 11,637,935 | B2 * | 4/2023 | Kauffman | H04M 15/43 |
| | | | | 455/406 |
| 2003/0191711 | A1 * | 10/2003 | Jamison | G06Q 20/14 |
| | | | | 705/40 |
| 2004/0054967 | A1 * | 3/2004 | Brandenberger | G06F 16/958 |
| | | | | 715/255 |
| 2005/0071766 | A1 * | 3/2005 | Brill | G06F 16/9538 |
| | | | | 707/E17.108 |
| 2007/0073758 | A1 * | 3/2007 | Perry | G06Q 30/0633 |
| | | | | 707/999.102 |
| 2008/0281794 | A1 * | 11/2008 | Mathur | G06F 16/958 |
| 2009/0327914 | A1 * | 12/2009 | Adar | G06F 16/958 |
| | | | | 715/745 |
| 2012/0259882 | A1 * | 10/2012 | Thakur | G06F 16/954 |
| | | | | 707/E17.074 |

(Continued)

OTHER PUBLICATIONS

"Xfinity.com", archived on Aug. 1, 2021 by Internet Archive Wayback Machine, https://web.archive.org/web/20211201000645/https://www.xfinity.com/overview, retrieved on Dec. 28, 2023.*

*Primary Examiner* — Brendan Y Higa
(74) *Attorney, Agent, or Firm* — Farber LLC; Jonathan A. Winter (57) ABSTRACT

A system and method incorporating Robotic Processing Automation and Machine Leaning to finding telecom expense management information in a way that said RPA agents can match plan information to user usage data as well as notify other downstream RPAs of changes so they can run their cycles in a timely fashion.

25 Claims, 8 Drawing Sheets

(56) References Cited

U.S. PATENT DOCUMENTS

| | | | | |
|---|---|---|---|---|
| 2012/0302204 | A1* | 11/2012 | Gupta | H04M 3/42221 |
| | | | | 455/406 |
| 2014/0359411 | A1* | 12/2014 | Botta | G06F 40/197 |
| | | | | 715/205 |
| 2015/0161257 | A1* | 6/2015 | Shivaswamy | G06F 16/951 |
| | | | | 707/709 |
| 2017/0220681 | A1* | 8/2017 | Daas | G06F 40/186 |
| 2018/0191764 | A1* | 7/2018 | Chawla | G06F 16/951 |
| 2020/0250259 | A1* | 8/2020 | Nanavati | G06F 9/45529 |
| 2021/0263978 | A1* | 8/2021 | Banipal | G06N 20/00 |
| 2022/0245479 | A1* | 8/2022 | Goldberg | G06N 20/00 |
| 2023/0087930 | A1* | 3/2023 | Schrenkel | G06Q 20/145 |
| | | | | 705/7.31 |
| 2023/0328184 | A1* | 10/2023 | Kauffman | H04W 4/24 |
| | | | | 455/406 |

* cited by examiner

ROBOTIC PROCESS AUTOMATION FOR TELECOM EXPENSE MANAGEMENT INFORMATION CHANGE DETECTION AND NOTIFICATION

FIELD OF THE INVENTION

The present invention relates to systems and methods for obtaining telecom expense management related information through robotic process automation. RPA agents (or robots, or bots) navigate supplier sites for new offerings and pricing changes, which may impact the expense management process or offer enhanced value to customers. Further, regulatory sites for requirements and taxation are also analyzed and factored in by the system. These agents can propose changes to other automation bots that optimize the spend as well as give them a heads up that there are changes so they can start processing invoices and analyzing the changes in offerings earlier than when the typical expense management bill processing would have started. This ensures that early payment incentives are secured delays in processing can be avoided.

BACKGROUND OF THE INVENTION

As robotic process automation takes a growing role in telecom expense management analysis, there is a need for detection and early notification of changes to billing models, available plans, and telecom related taxation and regulatory rules. While many bots run routinely to process invoices, if a change has occurred on a vendor website, these bots may require manual intervention or advanced problem resolution. This can delay invoice processing and potentially add significant delays which can eat into savings obtained through early payment incentives.

Telecom expense management (TEM) is an industry which requires the retrieval and processing of a vast amount of complex data from multiple sources which must then be treated and processed in finite timelines. The savings obtained are often tied directly into the compensation of TEM service firms and capturing all incentives, including the time sensitive ones, is paramount to the longevity and financial health of these entities.

TEM service providers can have 1000's of customers each of which may have 1000's of employees and potentially dozens of carriers and equipment and service suppliers for which invoices must be gathered, validated, and paid monthly. However, carrier plans change, equipment manufacturers come out with new devices, and customers' needs can all shift from month to month. Recommending the best performing and most economical plan for all of these customers is challenging in view of the constantly shifting environment. RPAs that continually monitor and analyze changes and their applicability to a given enterprise allow these TEM providers to remain pro-active and to provide relevant and timely recommendations to their customers.

It would thus be very beneficial to have a system that is capable of detecting and analyzing changes in telecom provider offerings that are relevant to a TEM companies' customers.

It would be further beneficial to have such an RPA recognize the changing needs of the TEM companies' customers and compare these to existing plans in place as well as new plans.

It would also be beneficial to have the RPA recognize changes and to provide early notification of these changes to other RPA's that parse or process the data so that those RPA's can start their processing cycles earlier in the billing cycle to allow ample time to resolve any discrepancies or difficulties in the automated process.

Therefore, a need exists for a system that can apply machine learning to detect and act upon changes to TEM related supplier and regulatory websites to optimize customer plans and costs.

SUMMARY OF THE INVENTION

Therefore, it is an object of the present invention to provide improved methods and controls to create RPA bots to gather data from websites and portals containing TEM related information and to notify other RPA bots of changes that could negatively impact their ability to function autonomously so that payment schedules can be maintained.

It is further desired to provide a system and method to allow such an automation bot to also detect, or have as an input, the desired ideal plan from recent activity performed by the end users using such telecom plans.

It is still further desired to provide a system and method that incorporates machine learning to optimize how these bots recognize the target data they are looking to obtain and how they navigate the landscape of the webpages or portals on which this data is housed.

It is still further desired to provide a system and method that incorporates machine learning to optimize how these bots read and use the user data and voice usage data from these portals to formulate the needs of the end users with respect to available plans.

These and other objects are achieved by providing a Robotic Process Automation (RPA) system for identifying updates to website data used by other RPA routines is provided. The system includes a computer having a storage and a network connection. A first RPA program includes software executing on the computer which is adapted to access known data on the storage. The known data is indicative of website data used by a second software. The first RPA program accesses one or more websites via the network to perform a comparison, based on the known data, to determine if changes have been made to the one or more websites which changes may impact if the second software can obtain data from the one or more websites. The first RPA program issues an alert accessible to the second software if the comparison indicates that the website data used by the second software may be accessible in a different way than indicated by the known data. The first RPA program adapted to receive a response from the second software indicative if accessibility of the website data has changed, wherein computer updates the known data.

In certain aspects the known data which has been updated is used in the comparison at a next time the first RPA software accesses one or more websites to perform the comparison. In another aspect the first RPA program determines modeled website data based on the website data and compares to the known data to determine structure or storage locations of the website data has changed. In certain aspects the known data is indicative of a model of at least one of the one or more websites, the model indicates where the website data used by the second software is stored based on a prior retrieval of website data by the second software, the first RPA program performs the comparison by accessing the website data to determine modeled website data indicative of a second model of the at least one of the one or more websites, the comparison determines if the model and the second model are different. In certain aspects the alert is indicative of differences between the model and the second model. In other aspects the response is indicative of whether the differences impact an ability of the second software to obtain data for the second software to run. In still other aspects, based on the response indicating the differences do not impact the ability of the second software to obtain data, the first RPA program modifies how it determines modeled website data.

In other aspects the response indicates accessibility of the website data the second software uses has not changed based the first RPA program modifies how it issues alerts based on the comparison to reduce a likelihood that the alert associated with the response would have been issued. In still other aspects the first RPA program and the second software are part of one software program executing on the computer. In other aspects the one or more websites include a telecom provider website which communicates information on telecommunication service plans.

In other aspects a Robotic Process Automation (RPA) system is provided for identifying updates to website data used by other software, the system includes a computer having a storage and a network connection. Software executes on the computer comprising a first RPA software adapted to access one or more telecom fee websites at a first time and model the one or more telecom fee websites to generate modeled website data at the first time, said modeled website data stored in the storage and the first RPA software utilizes the modeled website data to identify website data used by a second software. The first RPA software is adapted to access the one or more telecom fee websites at a second time, later than the first time, to identify changes to the website compared to the modeled website data and the first RPA software issuing a notification accessible to the second software indicative that the changes may impact an ability of the second software to capture data used by the second software. The second software issues a response accessible to said first RPA software indicative of if the changes impact the ability of the second software to capture data used by the second software and based on the alert, the first RPA software updates how alerts are issued based on the response.

In certain aspects the first RPA software updates how alerts are issued by reducing likelihood an alert would be issued based on identified changes which previously issued an alert with a response indicating the changes do not impact the ability of the second software to capture the data used by the second software. In other aspects the first and second times are each prior to an expected time that the second software will obtained the website data. In still other aspects the first and second times are both after a most recent time that the second software obtained the website data. In yet other aspects the model is determined by comparing visual elements of the website at the first and second times which visual elements indicate a storage location or structure of website data. In yet other aspects the telecom fee website is a telecommunication provider website which provides information on service plans offered by one or more telecommunication providers. In still other aspects the telecom fee website is a regulatory website which information on regulatory taxes and/or charges associated telecommunication services.

In other aspects a Robotic Process Automation (RPA) system for monitoring website structure and capturing website data is provided. The system includes a computer having a storage and a network connection. Software executes on the computer comprising a first RPA software adapted to access one or more telecom fee websites to gather telecom data selected from the group consisting of: data related to telecom service plans, data related to telecom rate plans, telecom service usage data and combinations thereof. The first RPA program determines a model of the one or more telecom fee websites based on the telecom data gathered, the model identifying website structure relevant to gathering telecom data at future times. The first RPA program accesses the one or more telecom fee websites to determine changes to the one or more telecom fee websites as compared to the model and based on the changes identified, said first RPA program determining if telecom data can be accessed even with the changes and if the first RPA program determines the telecom data cannot be accessed, the first RPA program issuing an alert and the model is updated in response to the alert; and if the first RPA program determines the telecom data can be accessed, the model is updated if necessary.

In certain aspects, if the first RPA program determines that the telecom data can be accessed, the model is updated such that the model reflects the changes to the one or more telecom fee websites relates to irrelevant information to obtaining the telecom data. The telecom fee website could have a variety of telecom related expense information such as invoices/bills, government fees and various other taxes and miscellaneous charges that are applied to a telecom bill. This information may be available from multiple different websites. In yet other aspects the model identifies website elements selected from the group consisting of: recognizable website shapes indicative of buttons, tag names, field names, alt text for images, menus and combinations thereof and wherein when changes are identified in the one or more telecom fee websites, the elements are compared to first information indicative of telecommunication plan structures and/or pricing associated with the changers to determine if the changes impact if the telecom data can be accessed by the first RPA program. In still other aspects the first information is selected from the group consisting of key words, synonyms or similar terms. In yet other aspects the RPA program identifies website features within the modeled website data by identifying a search function within the website and using key words, synonyms to the keywords, similar terms to the keywords and combinations thereof to perform a search using the website function to provide a narrowed set of modeled website data, the RPA program further determining, from the narrowed set of modeled website data, the telecom data. In still other aspects the modeled website data identifies a structure of the website indicative of two or more types of data presented in two or more locations and wherein the modeled website data at the second time is generated by identifying changes within less than all of the two or more locations based on one of less than all of the types of data the RPA program searches for. In yet other aspects the modeled website data identifies groupings of categories of data and identifies locations on the websites where those categories of data are located and wherein the RPA identifies one or more of the categories of data to obtain the telecom data at the second time in order to obtain the updated rate plan data. In still other aspects the first RPA modifies a selection of at least one telecommunications rate plan for the one or more telecommunication devices at a telecommunications provider server to include a rate plan for the one or more telecommunication devices available with the updated rate plan data but not available prior to the changes to the one or more telecom fee websites.

In yet other aspects a Robotic Process Automation (RPA) system for identifying updates to website data used by other RPA routines is provided. The system includes a computer having a storage and a network connection and software executes on the computer comprising a first RPA software adapted to access one or more websites and model said one or more websites to generate modeled website data. The software is configured to perform a comparison by comparing said modeled website data to known data indicative of website data used by a second software and based on the comparison, issuing an alert accessible to the second software if the modeled website data indicates that the website data used by the second software may have changed. The first RPA program is adapted to receive a second notification from the second software indicative that the comparison indicates the website data has changed and further updating the known data which is used at a next time that the first RPA software models website data and then performs the comparison by then comparing the modeled website data to the known data which has been updated.

In certain aspects the first RPA software accesses the one or more websites to generated the modeled website data at first time determined based on being prior to a known time the second RPA attempts to access the website data which first time is between a last time the second RPA accessed the website data and the known time. In still other aspects the known data is indicative of where telecom expense management (TEM) data can be accessed. In yet other aspects the TEM data is data related to rate plans for use of one or more telecommunications services. In yet other aspects the model uses website characteristics to determine how to access the TEM data, the website characteristics selected from the group consisting of: synonyms, known phrases, pseudonyms, image files, alternate text, menu systems, common locations to find data, file naming conventions using dates, times, and/or key words, image recognition and categorization, and combinations thereof.

In yet other aspects, a Robotic Process Automation (RPA) system is provided for identifying updates to website data used by other RPA routines, the system includes a computer having a storage and a network connection. Software executes on said computer comprising a first RPA software adapted to access one or more websites and model said one or more websites to generate modeled website data, said software configured to perform a comparison by comparing said modeled website data to known data indicative of website data used by a second software. The first RPA program determines accessibility to website data has changed based on the comparison, the first RPA program uses website characteristics to determine how to access the TEM data, the website characteristics selected from the group consisting of: synonyms, known phrases, pseudonyms, image files, alternate text, menu systems, common locations to find data, file naming conventions using dates, times, and/or key words, image recognition and categorization, and combinations thereof. The first RPA program accesses the one or more websites based on an updated model that is determined based on the website characteristics.

In one configuration, a system is provided that utilized RPA bots to automatically scan and investigate vendor websites to gather the data on those websites to create a model of each vendor website. This in turn can be used by the RPA bots as a look up reference to find relevant information needed to analyze and resolve payment of a bill for a current billing cycle. In the case where a particular vendor website may change (e.g., new pages or tabs may be added, existing information may be moved to a different tab or be accessed through a different login, and the like), the model can be used as a reference for the RPA to provide intelligence as to how to learn and find the needed information on the newly configured website.

In another configuration, consider an example of a TEM customer who has gone through the exercise of evaluating existing telecom plans and their user needs, and comes up with what they consider is an ideal telecom plan for their particular needs. The plan meets the budget constraints and provides adequate coverage at an optimal cost.

This situation is in reality, however nothing more than a single snapshot in time. Most likely by the time the ink is dry on the telecom contract, there are already users experimenting with new applications that use increased data, manufacturers are on the verge of releasing new devices, and the next latest and greatest social media or work force management collaboration technology being released, tried and adopted.

In addition, the competitors of the chosen carrier continue to evolve and adapt in the changing market offering lucrative incentives and tailored plans to meet the latest trends and lure away customers from their competition.

The customer who just signed up for a year or possibly two or three, will most likely be discouraged from doing the labor-intensive exercise of analyzing the companies needs and matching this to the latest offerings on a regular basis. Instead, they will live with the selected plans based on that snapshot in time and only really look at changes as the contract comes up for renewal or a very noticeable increase in spending occurs.

To a large degree, companies don't question telecom expenses. This essential service is not something that can be cut back or restricted. Communications is the lifeblood of most companies when it comes to sales, marketing, and support. All these intensively depend on reliable, fast and available telecom services to communicate with clients, prospects, partners and suppliers. Studies have shown that many companies will spend more time auditing a $1,000 travel expense report than they will a $100,000 telecom bill. No one is willing to tell the division executive to cut back on his data use or limit his calls.

The system and method proposed utilizes an automated RPA that continually monitors and analyzes the availability of new offerings such as plans, devices, features, and apps as they become available. Second, it will continually monitor how the exiting plans in place are actively being used by the customers to identify what the customers current needs are and identify trends.

Now, consider again the example a company that has just signed up for a plan but is now facing some economic challenges and was forced to reduce its sales force (e.g., by ½). Further, the company moves from a paradigm of extensive travel to one of extensive remote work involving a very large increase in video conferencing and a large reduction in telephone roaming. Clearly, any plans that were signed up for before such changes have become essentially obsolete and far from optimal for the current situation.

Existing users will likely incur overage costs for their data, resulting in budget overruns despite the company having reduced the number of lines with the staff reduction and reduced travel. The large roaming plans are a waste of budget dollars and the lack of adequate data plans to accommodate the additional bandwidth are preventable and optimizable. Of course, those making the staff reduction decisions, adopting the tools for increased video use or bringing new tools and processes on board, rarely consider the TEM aspect to such moves. Often, they are not even aware of what plans are in place or what the potential impacts are. To a large degree, it is unrealistic to expect that to change. A departmental head specialized in running part of the business would not likely take an interest in such details. For this reason, an automated bot such as the one proposed is key to provide the necessary insights and to make necessary changes as they take place.

It is understood that changes can be made within month with most carriers based on usage. Going back to the example, once the newly adopted video conferencing polices take place, the bots would detect increased usage within the month that it is occurring and would change over the plans to higher data plans before the bill is issued in an attempt to avoid overage charges.

Similarly, when no roaming has occurred, the bots could disable roaming features to recoup these costs. In some cases, the bots can interact with travel booking systems and detect that no travel has been planned for corporate functions and can also use that as an indicator to adjust downward various roaming features.

The RPA monitoring telecom usage detects changes in usage by a company and employs a set of measurement thresholds, which are used to help determine whether an action should be taken to change plans or whether to notify another plan optimization RPA.

While the system is intended to run automatically and autonomously in the background to look for TEM data, it is also possible to run such a system in an assisted mode to run partial tasks to help a human operator. The system can be configured in any manner desired by the customer.

What is desired then is a system and method to detect the changes both in new offerings from telecom service providers as well as changes in user behavior as it is mapped to a TEM system. RPAs can automatically be notified of potential changes affecting their function so they can take appropriate action in a timely fashion without human intervention.

In one embodiment, the system accesses vendor or carrier systems looking for TEM offerings such as plans and features that can be mapped to user usage behavior.

In another embodiment, the system may query carrier systems to obtain the latest user usage data and behavior of TEM related devices.

In yet another embodiment, the system may notify downstream RPA systems of changes occurring to usage behavior or the availability of new plans, regulations or fees. These secondary RPAs are used for more detailed plan selection and mapping and thus have a 'heads up' of changes and can run earlier than usual to ensure there is no significant delays should manual intervention be required.

In one configuration a system and method of logging into and navigating a carrier websites or portals using an input model outlining a set of steps to locate and obtain the target TEM data is provided. This is used to detect and discover new and existing plans and features.

In another configuration a system and method are provided by which the RPA robot can obtain user usage data from billing information in terms of voice, data, SMS, and roaming usage, as well as application-level usage. Highly granular data can be obtained, and in some cases even transaction level data within an application can be obtained. Cost savings can also be extended to software licensing models in addition to telecom costs for bandwidth alone.

The method still further comprises the steps of handling exceptions such as errors in capturing the data that include triggering manual intervention where required.

Other aspects and features of the present invention will become apparent from consideration of the following description taken in conjunction with the accompanying drawings.

DETAILED DESCRIPTION OF THE INVENTION

Referring now to the drawings, wherein like reference numerals designate corresponding structure throughout the views. The following examples are presented to further illustrate and explain the present invention and should not be taken as limiting in any regard.

Figure 1A:
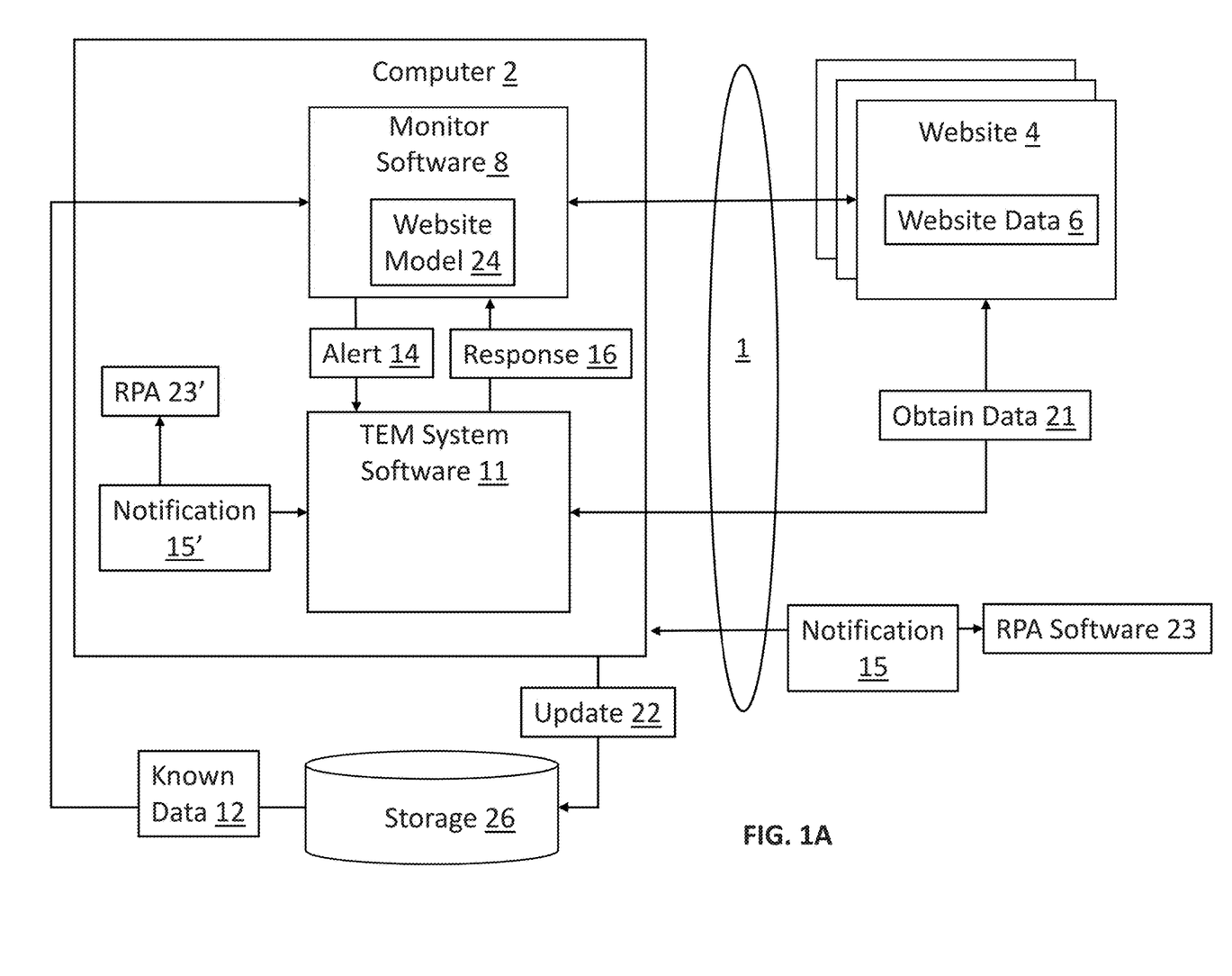
FIGS. 1A-1C are block diagrams showing and RPA system and how website models are created and monitored.

Referring to FIG. 1A, the computer 2 is shown with monitoring software 8 and TEM system software 11. The monitoring software 8 monitors the websites 4 for changes via a network 1, particularly changes that may impact the ability of the TEM software 11 to obtain data 21. This monitoring software 8 accomplishes this by creating a website model 24 that helps determine the structure and organization of the website 4, particularly where data of interest is stored and how to access that data. This information may be learned by looking at menu hierarchy, images/frames, alt text describing features of a website and other identifying features which indicate where data can be accessed. This website model 24 is also determined based on known data 12 which can indicate what data the TEM software 11 uses and where that data comes from/how it is accessed. With this website model 24 created, the monitoring software 8 checks the websites 4 for changes. As changes are detected, the monitoring software 8 determines if those changes could impact the ability for the TEM system software 11 to obtain the data 21. In that case, an alert 14 is issued to the TEM software 11 which may attempt to obtain data based on the alert 14 or determine based on the alert that there is no change to the ability to obtain data. A response 16 is sent back and the monitor software can update the website model 24 and the storage 26. In some cases, the response 16 may indicate an issue with obtaining data at which point changes to the way in which data is obtained 21 may be made in order to compensate for the website changes. Based on the response 16, the website model and/or any thresholds for issuing alerts 14 may be modified based on if the alert was correctly issued or not.

The known data 12 of the storage can indicate information related to website characteristics which are associated with website data 6 that the TEM software 11 uses. These website characteristics can include, e.g. synonyms, known phrases, pseudonyms, image files, alternate text, menu systems, common locations to find data, file naming conventions using dates, times, and/or key words, image recognition and categorization, and combinations thereof. This information can be used by the monitoring software 8 to determine when changes occur that are associated with a response 16 indicating the TEM software 11 could not obtain some or all of the data 21, the website characteristics can be used in connection with a new or updated website model 24 or to better refine the model to attempt to determine where the data that could not be obtained after the update can now be obtained. The monitoring software 8 can then issue another alert 14 to the TEM software, but this time, the alert can indicate modifications to how the TEM software 11 obtains the data 21.

Figure 1B:
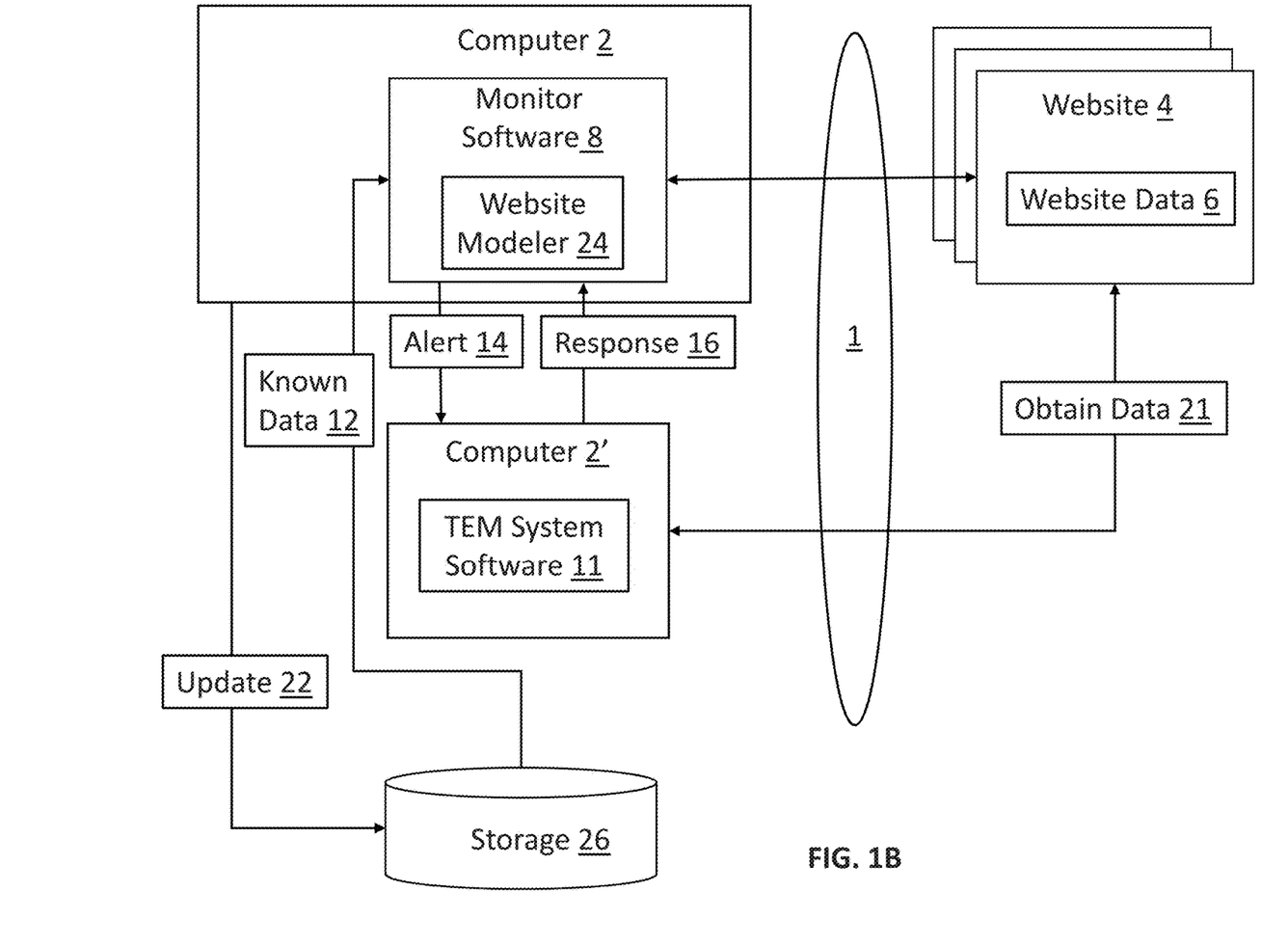
Figure 1C:
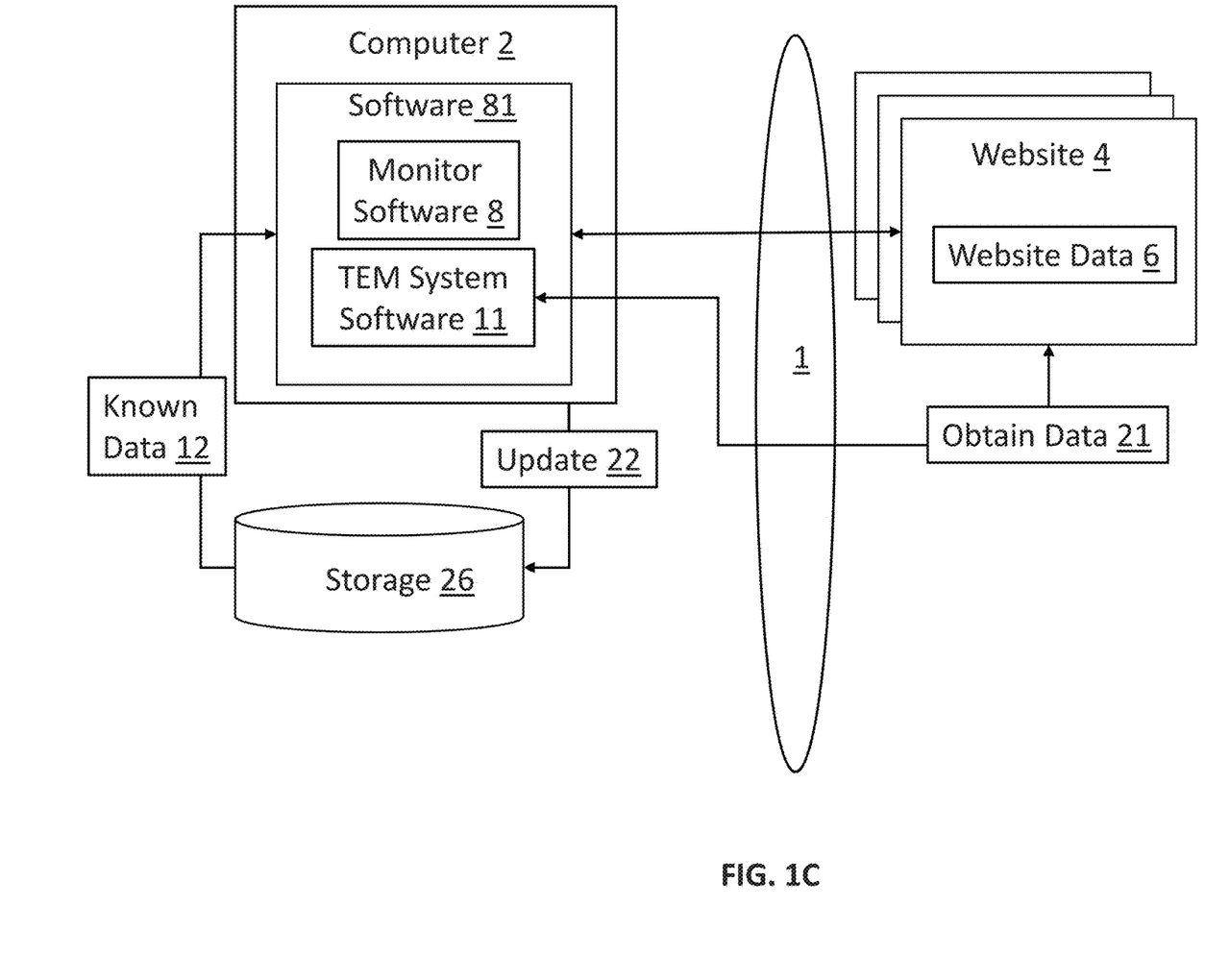

FIGS. 1B and 1C are similar in many respects to FIG. 1A, but where FIG. 1A included the monitor software 8 and TEM software 11 as two programs on a computer (which could be multiple computers within a server arrangement), FIG. 1B shows two separate computers 2 and 2', these may be in communication over a network. This could be e.g. the internet or various combinations of network connections, depending on the architecture. The network between computers 2 and 2' is not shown for space saving. FIG. 1C provides a configuration where the monitor software 8 and TEM software 11 are part of the same program in that the software 8 and 11 may be portions of code within a larger program 81. The alerts and responses shown in FIGS. 1A and 1B still apply in FIG. 1C, but are not shown.

Figure 2:
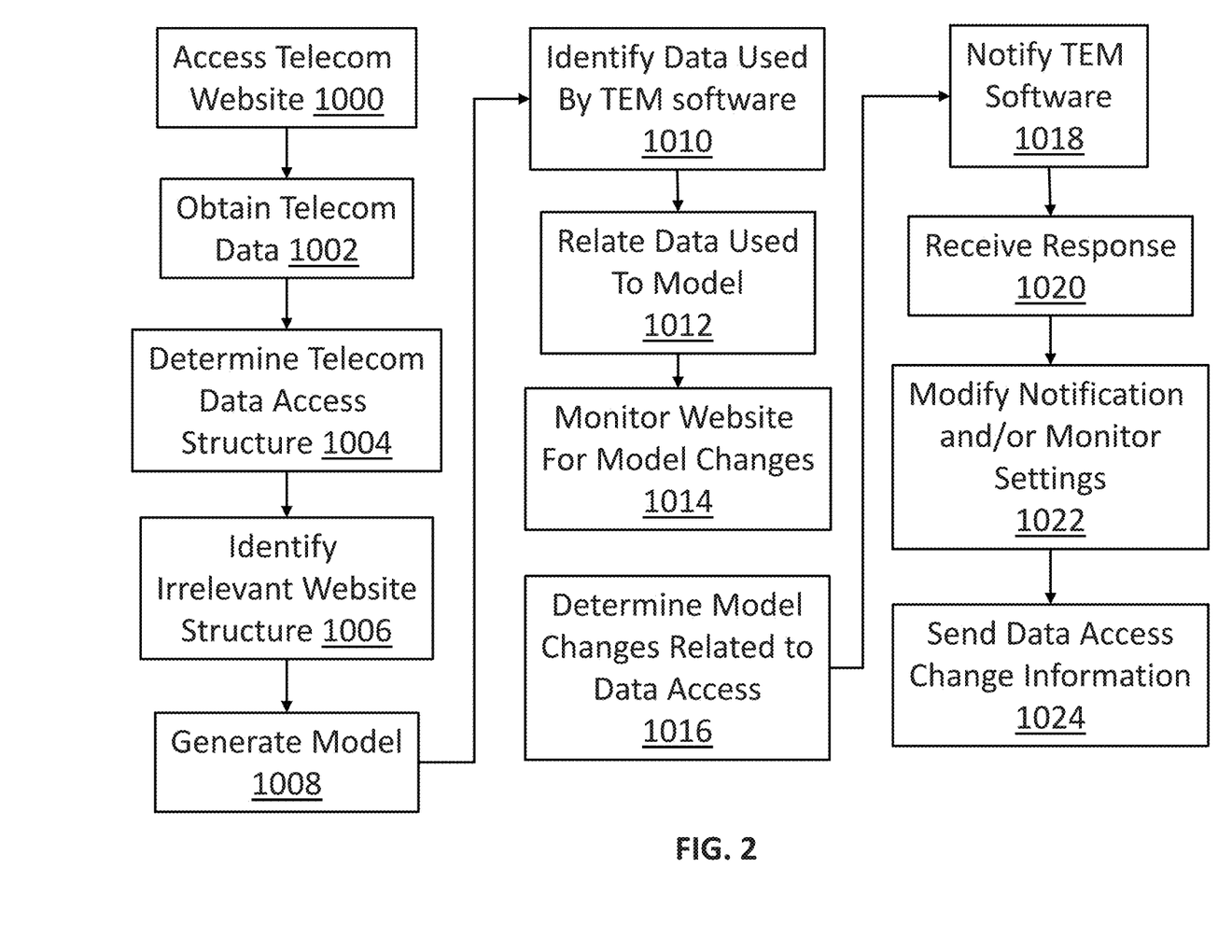
FIG. 2 is a logical flow diagram according to FIGS. 1A-1C.

FIG. 2 provides a process flow diagram whereby the telecom website is accessed 1000 and telecom data is obtained 1002. The monitoring software 8 determines the structure of that access 1004 so that it can come back at a later time and gather updated data, for example, the next month's information. This structure will inform how data can be gathered. The website structure 1006 is then identified by the software 8 and a model is generated 1008. Data used by the TEM software is identified 1010, for example by accessing the storage 26 which may be periodically updated 22. With the model determined and the data used by the software also known, the model and the data used are related 1012. Then, the website is monitored for changes 1014, specifically that would impact the model and how data updates are obtained. Based on this monitoring, changes to the website may be determined 1016 and the software 11 is notified 1018 of changes that may impact the ability to gather data. The TEM software 11 then determines if those changes impact the ability to gather data and a response received at the software 8. Based on the response, the software 8 can modify how it monitors/notifies of website changes. As shown in FIG. 1A, a notification 15/15' can also be made to other RPA software routines 23/23' which may use data. The notification may come from the monitor software 8 or the TEM system software 11 or generally from the computer(s) running this software.

Figure 3:
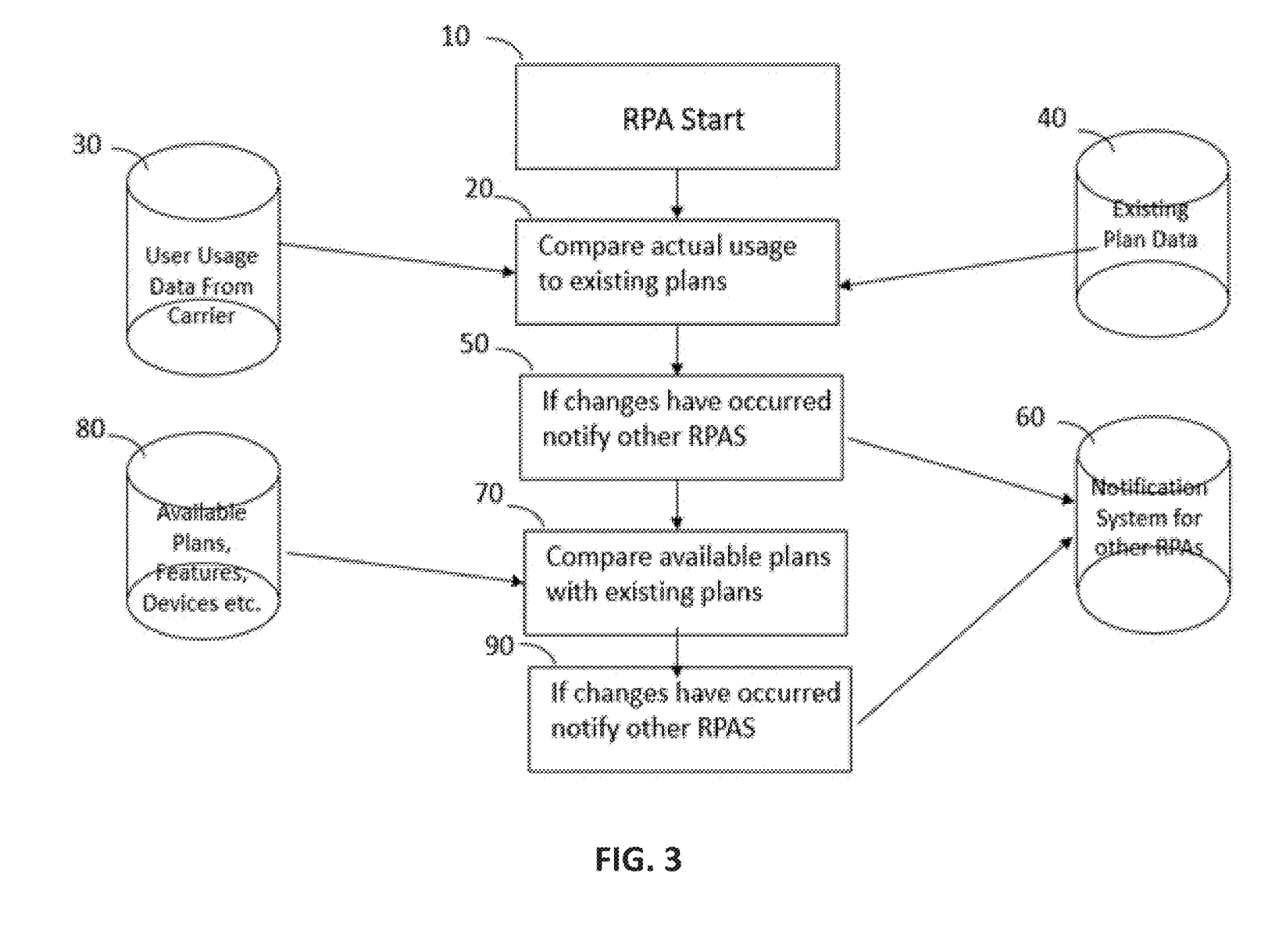
FIG. 3 is a block diagram illustrating an RPA process detecting changes in user behavior and available plans which can be used in connection with the RPA system of FIGS. 1A-C.

FIG. 3 depicts an RPA process with further details how the monitoring software 8 integrates with the TEM software 11 where the TEM software detects changes in user behavior and in this case available plans. The RPA of the software 11 starts (10) by obtaining the actual usage data from the user data (30) available from carrier feeds along with the existing plans (40) from the carrier. It then compares (20) this actual usage to the plans in place. This allows for a comparison to see how well the plans are performing in meeting the actual usage, or conversely how the current usage matches with the existing plans in place.

If changes have occurred (50), in usage patterns (30) so that these do not fit with the existing plans (40) the RPA will notify other RPAs (60) that may require additional time to run if they rely on this information to complete. In many cases, these additional RPAs may have time critical functions that may be slowed down by changes, especially if these end up putting the downstream RPA in a mode that requires manual intervention or escalation.

The RPA then obtained available plans (80) from the carrier and compares (70) these with the existing plan to see any of these have changed. If changes have occurred (90) it then notifies other RPAs that may be dependent on these plans. Again, to aid in the processing time required for the often time critical RPAs to run. This monitoring and notification of other RPAs In most cases, when no changes have occurred, the RPA simply acts to monitor usage and monitor available plans, features and devices. However, if changes have occurred, the notifications (60) can give a margin to the other RPAs by giving them a heads up. In one such example, processing invoices within a week or receipt can give customers a discount. Regardless of the reason, if changes to plans (80) have occurred and the RPA processing the invoices required plans to complete, we may miss substantial discounts if we don't meet the processing deadline. Given that these downstream RPAs can only initiate once the invoice is provided, any heads up to monitor invoice receipt more frequently or to preprocess the changes in available plans before the invoice is received can all optimize the process and help ensure the timeline is kept.

As explained previously, the system can be configured to create a model of a vendor website. Being able to pull all relevant and irrelevant information from a vendor portal, provides the ability to create a model for discerning the appropriate path via the normalization of information. It also enhances the model and potentially allow for expansion it into other areas. In effect, it is similar to inventorying keywords on a website but both a narrower and a broader scope. The RPA bots are focusing on accurate information for future data-pull activities.

In pulling data from vendor portals, where specific APIs are not available, the RPA bot must navigate and parse the available data from the source page data available on the portal. This can include buttons that can be examined for recognizable shapes and locations (i.e., hamburger menu, magnifying class etc.), and then tag and field names that can be matched to key words or synonyms. In many cases, websites are required to be accessibility compliant and provide alt text for images and menus that can be read out to visually impaired. Key words can often be found in this text that can help an RPA find a desired target.

RPAs can also leverage the website features themselves to find a target. For example, using the search bar of a website to look for invoices, may bring up a set of results in a pane which the RPA can parse. This can be a time saver compared to traversing the raw website data using traditional techniques.

In pulling this data together, the primary purpose may be to find a data set, such as the latest invoice. However, it is also possible to create a full model of what information is contained on the website as well as how the website is organized.

In the first case, a model is formed of all the available data that may be of interest to applications both present and future. This data set will certainly vary from one vendor to the next and the RPA can normalize the data keeping track of vender specific transformations required. For example, if looking at customer data use, one vendor may show daily maximums whereas another vendor may show weekly maximums and another monthly totals only. In such cases, the RPA can transform the data keeping daily, weekly and monthly totals by adding up the daily totals to form weekly and monthly totals and by evenly dividing the monthly totals into days and weeks when the vendor does not supply the granular data. In another example, the conversions may entail unit conversions or additional processing. For example, one vendor may show data use but another may show a percentage of plan used. The RPA can generate the percentage of plan based on the usage and plan limits to fill the data out in a model that is normalized across vendors and shows a superset of relevant data.

In the second and broader case, a model is created regarding the structure and presentation of the website. Such a model shows the logical grouping of relevant data and where it is kept in relation to other data. This can help RPA search bots more quickly discover and retrieve relevant data by having a better idea of the organization and structure. For example, the RPA can discover that historical data past 3 months is kept in a separate archived area. Knowing this and presenting in the model will help other RPAs save the trouble of searching for data such as invoices and getting false positives when they find the local more recent store of invoices. It can also save confusion for these bots as they may toggle between recent data and historical data trying to learn the structure but get confused when they find one invoice in each area but not the other. In a worst case scenario, they learn that this is NOT the right area for invoices, and then direct the next search to the other area, once again discovering that the prior area was the right one as they are not sophisticated enough to realize the implication of the invoice date.

In another example, group data may be all listed together with a group ID and knowing what group a user is in we can narrow down a set of data by group quickly. Another vendor may not offer group IDs but instead allows sorting by plan, or another by device type (or all of the above). In these cases, the model can provide the details to the search bot of what meta data and what data groupings and relations ships are available on a given site as a common definition shared between sites. To be more specific, if a website grouped users into groups, the model could include a Y/N field to show the search bot using the model that this is present and can be used. These models and be extended as in the first case described above to include a normalized model for all sites. In such a case, going back to the groups example, the model can go as far as creating the data set from existing data which adds the group to an intermediate data set so that all data looks the same. In most cases this is not necessary, but when comparing plans or data sets across vendors, having a uniform normalized set of data can be of interest and can be supported.

Figure 4:
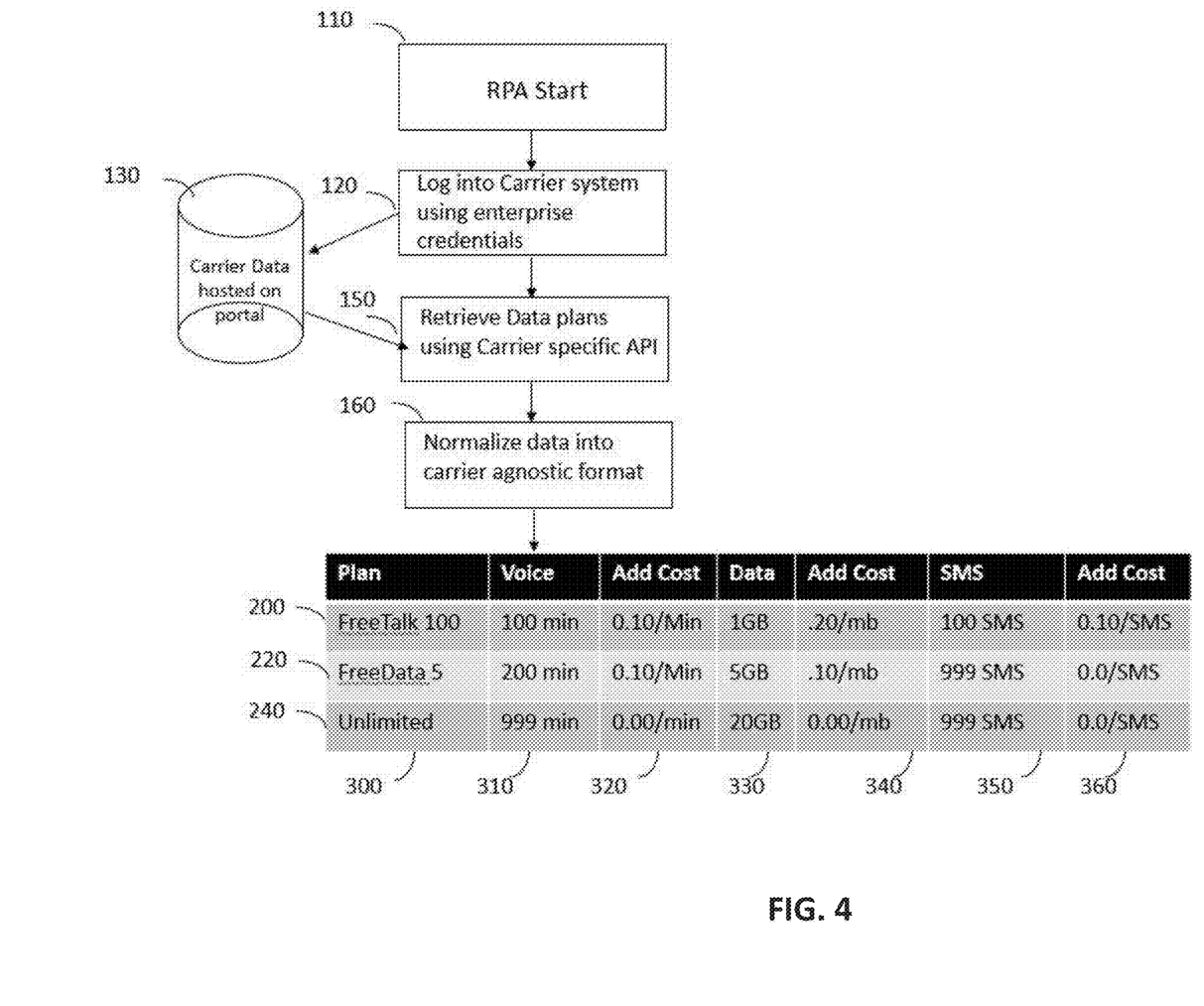
FIG. 4 is a block diagram illustrating an RPA process of retrieving, parsing and comparing plans which can be used in connection with the RPA system of FIGS. 1A-C.

Referring to FIG. 4, the process of normalizing available plan data is shown. The process starts 110 by logging into the carrier system 120. Carrier data 130 is accessed and retrieved 150 using a carrier specific API or otherwise by website access structure. The data is normalized among a number of carriers 160 into a unified format. For example this normalized data may include the plan names 300 (as shown FreeTalk100 (200), FreeData5 (220), Unlimited (240), the available minutes 310, the overage cost 320, the data limit 330, the additional data cost 330, the message limit 350 and the overage cost 360. As shown in the unlimited plan, limits are set, but the additional cost is zero, thus an input of infinite minutes or the maximum number possible during the billing period does not need to be input as it is known that there is no overage charge.

Figure 5:
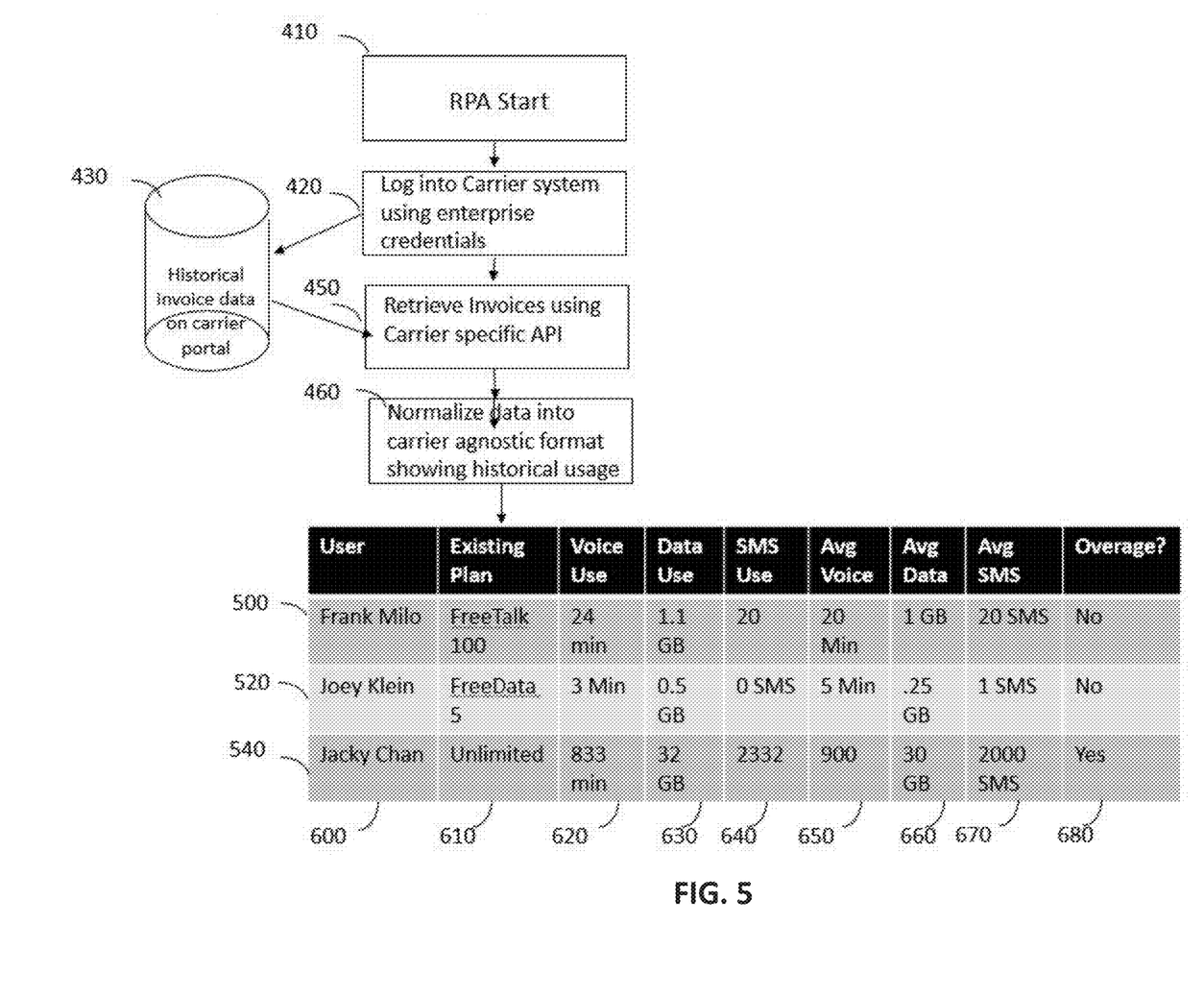
FIG. 5 is a block diagram illustrating an RPA process of retrieving, parsing and comparing historical usage which can be used in connection with the RPA system of FIGS. 1A-C.

Referring to FIG. 5, the process of normalizing usage data is shown. The process starts 410 by logging into the carrier system 420 and accessing historical data 430, invoices are received 450, and the data is normalized 460. The normalized format is shown with the names 500, 520, 540 as shown, the existing plan 610, the actual usage of voice 620, the actual data use 630, the SMS use 640 along with the averages 650, 660, 670 based on historical usage. Whether there are overages is then indicated 680 which can be useful for pooling users into lower limit plans to save costs or increasing the usage available for certain users to avoid overages. As this information is updated, various RPAs use this information to manage costs. However, the log on process 420 may change or the website change.

Figure 6:
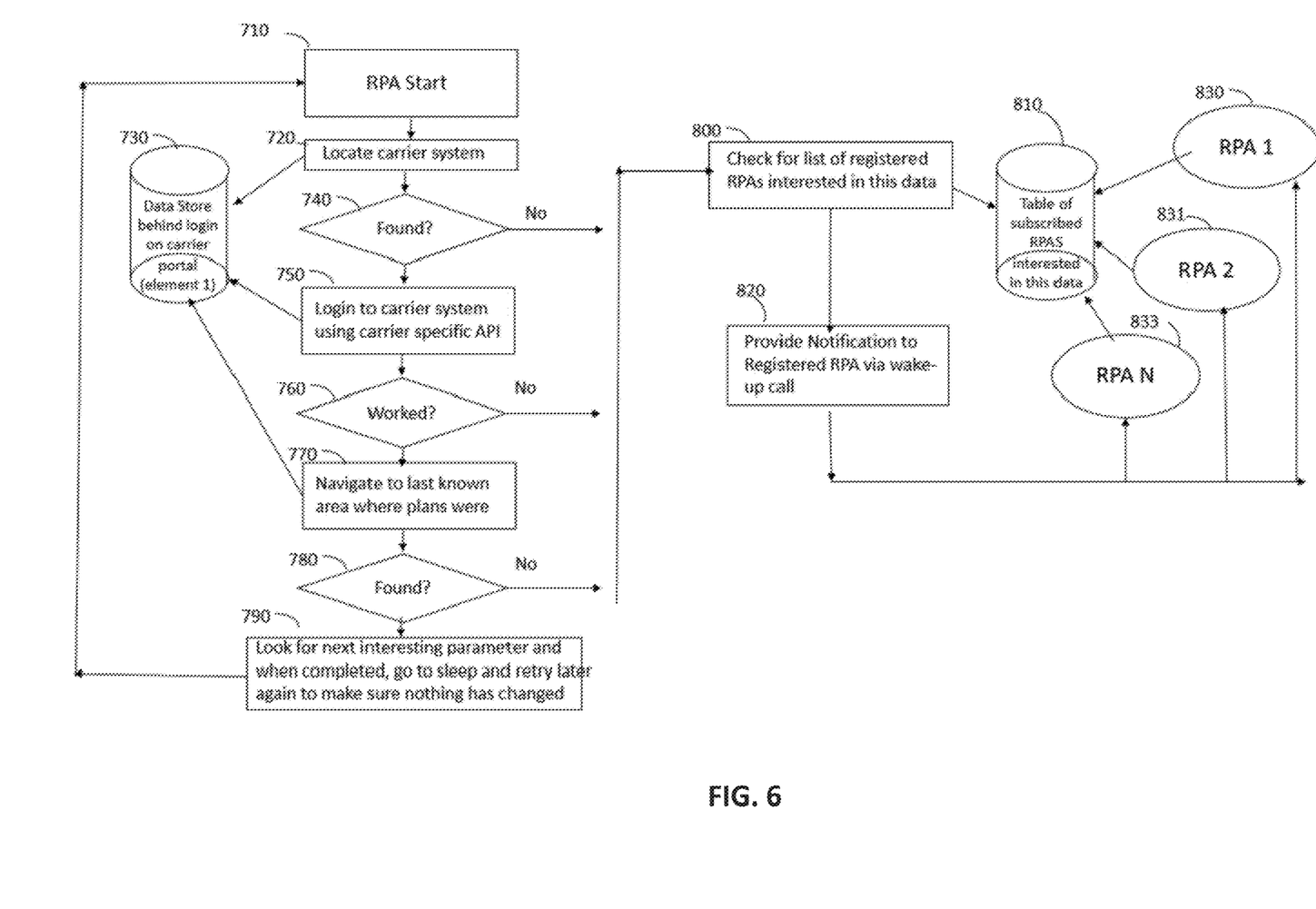
FIG. 6 is a block diagram illustrating an RPA process of determining if changes have occurred which can be used in connection with the RPA system of FIGS. 1A-C.

Referring to FIG. 6, the process of identifying problems accessing data is shown. The process starts 710 by locating carrier systems 720 and accessing the data store 730. If found, a login process is used 750 and if working 760, the last known area where plans are stored is navigated to 780. The parameters are reviewed accessed to determine changes and the system starts over. If at any time if the carrier system is not found 740, the login does not work 760 or the data is not found 780, the process of notifying other RPA that use the data 800 begins. The notification is generated 820 and sent to the RPAs 833, 831, 830. A table of subscribed RPAs 810 may be kept and updated as RPA data use changes.

While the invention is susceptible to various modifications, and alternative forms, specific examples thereof have been shown in the drawings and are herein described in detail. Is should be understood however that the invention is not to be limited to the forms or methods disclosed but to the contrary, the invention is to cover all modifications, equivalents and alternatives falling within the scope of the disclosures and/or claims.

What is claimed is:

1. A Robotic Process Automation (RPA) system for identifying updates to website data used by other RPA routines, the system comprising:
   a computer having a storage and a network connection;
   a first RPA program comprising software executing on said computer which is adapted to access known data on the storage, the known data indicative of website data used by a second software;
   said first RPA program configured to access one or more websites via the network to perform a comparison, based on the known data, to determine if changes have been made to the one or more websites which changes may impact if the second software can obtain data from the one or more websites;
   said first RPA program issues an alert accessible to the second software if the comparison indicates that the website data used by the second software may be accessible in a different way than indicated by the known data;
   the first RPA program adapted to receive a response from the second software indicative if accessibility of the website data has changed, wherein the computer updates the known data;
   the known data is indicative of a model of at least one of the one or more websites, the model indicates where the website data used by the second software is stored based on a prior retrieval of website data by the second software, the first RPA program performs the comparison by accessing the website data to determine modeled website data indicative of a second model of the at least one of the one or more websites, the comparison determines if the model and the second model are different;
   wherein the alert is indicative of differences between the model and the second model;

wherein the first RPA program is adapted to receive a response from the second software indicating the differences do not impact the ability of the second software to obtain data.

2. The system of claim 1 wherein the known data which has been updated is used in the comparison at a next time the first RPA software accesses one or more websites to perform the comparison.

3. The system of claim 1 wherein the first RPA program determines modeled website data based on the website data and compares to the known data to determine structure or storage locations of the website data has changed.

4. The system of claim 1 wherein the response is indicative of whether the differences impact an ability of the second software to obtain data for the second software to run.

5. The system of claim 1 wherein the first RPA program modifies how it issues alerts based on the comparison to reduce a likelihood that the alert associated with the response would have been issued.

6. The system of claim 1 wherein the first RPA program and the second software are part of one software program executing on the computer.

7. The system of claim 1 wherein the one or more websites include a telecom provider website which communicates information on telecommunication service plans.

8. A Robotic Process Automation (RPA) system for identifying updates to website data used by other software, the system comprising:
   a computer having a storage and a network connection;
   software executing on said computer comprising a first RPA software adapted to access one or more telecom fee websites at a first time and model the one or more telecom fee websites to generate modeled website data at the first time, said modeled website data stored in the storage and the first RPA software utilizes the modeled website data to identify website data used by a second software which website data is telecom data;
   the first RPA software adapted to access the one or more telecom fee websites at a second time, later than the first time, to identify changes to the website compared to the modeled website data and the first RPA software issuing a notification accessible to the second software indicative that the changes may impact an ability of the second software to capture data used by the second software;
   the second software issues a response accessible to said first RPA software indicative of if the changes impact the ability of the second software to capture data used by the second software and based on the response, the first RPA software updates how alerts are issued by reducing likelihood an alert would be issued based on identified changes which previously issued an alert with a response indicating the changes do not impact the ability of the second software to capture the data used by the second software.

9. The system of claim 8 wherein the first and second times are each prior to an expected time that the second software will obtain the website data.

10. The system of claim 8 wherein the first and second times are both after a most recent time that the second software obtained the website data.

11. The system of claim 8 wherein the model is modified by comparing visual elements of the website at the first and second times which visual elements indicate a storage location or structure of website data.

12. The system of claim 8 wherein the telecom fee website is a telecommunication provider website which provides information on service plans offered by one or more telecommunication providers.

13. The system of claim 8 wherein the telecom fee website is a regulatory website which information on regulatory taxes and/or charges associated telecommunication services.

14. A Robotic Process Automation (RPA) system for monitoring website structure and capturing website data, the system comprising:
   a computer having a storage and a network connection;
   software executing on said computer comprising a first RPA software adapted to access one or more telecom fee websites to gather telecom data selected from the group consisting of: data related to telecom service plans, data related to telecom rate plans, telecom service usage data and combinations thereof;
   said first RPA program determining a model of the one or more telecom fee websites based on the telecom data gathered, the model identifying website structure relevant to gathering telecom data at future times;
   said first RPA program accessing the one or more telecom fee websites to determine changes to the one or more telecom fee websites as compared to the model and based on the changes identified, said first RPA program determining if telecom data can be accessed even with the changes and if the first RPA program determines the telecom data cannot be accessed, the first RPA program issuing an alert and the model is updated in response to the alert; and if the first RPA program determines the telecom data can be accessed, the model is updated if necessary.

15. The system of claim 14 wherein if the first RPA program determines the telecom data can be accessed, the model is updated such that the model reflects the changes to the one or more telecom fee websites relates to irrelevant information to obtaining the telecom data.

16. The system of claim 15 wherein the model identifies website elements selected from the group consisting of: recognizable website shapes indicative of buttons, tag names, field names, alt text for images, menus and combinations thereof and wherein when changes are identified in the one or more telecom fee websites, the elements are compared to first information indicative of telecommunication plan structures and/or pricing associated with the changers to determine if the changes impact if the telecom data can be accessed by the first RPA program.

17. The system of claim 16 wherein the first information is selected from the group consisting of key words, synonyms or similar terms.

18. The system of claim 15 wherein the RPA program identifies website features within the modeled website data by identifying a search function within the website and using key words, synonyms to the keywords, similar terms to the keywords and combinations thereof to perform a search using the website function to provide a narrowed set of modeled website data, the RPA program further determining, from the narrowed set of modeled website data, the telecom data.

19. The system of claim 15 wherein the modeled website data identifies a structure of the website indicative of two or more types of data presented in two or more locations and wherein the modeled website data at the second time is generated by identifying changes within less than all of the two or more locations based on one of less than all of the types of data the RPA program searches for.

20. The system of claim 15 wherein the modeled website data identifies groupings of categories of data and identifies locations on the websites where those categories of data are located and wherein the RPA identifies one or more of the categories of data to obtain the telecom data at the second time in order to obtain the updated rate plan data.

21. The system of claim 15 wherein the first RPA modifies a selection of at least one telecommunications rate plan for the one or more telecommunication devices at a telecommunications provider server to include a rate plan for the one or more telecommunication devices available with the updated rate plan data but not available prior to the changes to the one or more telecom fee websites.

22. A Robotic Process Automation (RPA) system for identifying updates to website data used by other RPA routines, the system comprising:
a computer having a storage and a network connection;
software executing on said computer comprising a first RPA software adapted to access one or more websites and model said one or more websites to generate modeled website data, said software configured to perform a comparison by comparing said modeled website data to known data indicative of website data used by a second software;
when the first RPA program determines accessibility to the website data has changed based on the comparison, the first RPA program uses website characteristics to determine how to access the website data, wherein the website data comprising telecommunications expense management (TEM) data, the website characteristics selected from the group consisting of: synonyms, known phrases, pseudonyms, image files, alternate text, menu systems, common locations to find data, file naming conventions using dates, times, and/or key words, image recognition and categorization, and combinations thereof;
the first RPA program accesses the one or more websites based on an updated model that is determined based on the website characteristics.

23. The system of claim 22 wherein the modeled website data identifies a structure of the website indicative of two or more types of data presented in two or more locations and wherein the modeled website data at the second time is generated by identifying changes within less than all of the two or more locations based on one of less than all of the types of data the RPA software searches for.

24. The system of claim 22 wherein the RPA software identifies website features within the modeled website data by identifying a search function within the website and using key words, synonyms to the keywords, similar terms to the keywords and combinations thereof to perform a search using the website function to provide a narrowed set of modeled website data, the RPA program further determining, from the narrowed set of modeled website data, the TEM data.

25. The system of claim 22 wherein if the first RPA program determines the TEM data can be accessed, the modeled website data is updated to reflect changes to the website relates to irrelevant information to obtaining the TEM data.

* * * * *